United States Patent
Li et al.

(10) Patent No.: US 9,438,594 B2
(45) Date of Patent: Sep. 6, 2016

(54) METHOD AND APPARATUS FOR ESTABLISHING TUNNEL DATA SECURITY CHANNEL

(71) Applicant: HUAWEI TECHNOLOGIES CO., LTD., Shenzhen (CN)

(72) Inventors: Huan Li, Shanghai (CN); Christian Herrero Veron, Kista (SE); Lin Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/173,073

(22) Filed: Feb. 5, 2014

(65) Prior Publication Data

US 2014/0157395 A1 Jun. 5, 2014

Related U.S. Application Data (63) Continuation of application No. PCT/CN2011/078083, filed on Aug. 5, 2011.

(51) Int. Cl.
```
G06F 21/00    (2013.01)
H04L 29/06    (2006.01)
H04W 12/06    (2009.01)
H04W 12/08    (2009.01)
H04W 12/02    (2009.01)
H04W 92/14    (2009.01)
```

(52) U.S. Cl.
CPC .......... *H04L 63/0892* (2013.01); *H04L 63/08* (2013.01); *H04W 12/02* (2013.01); *H04W 12/06* (2013.01); *H04W 12/08* (2013.01); *H04W 92/14* (2013.01)

(58) Field of Classification Search
CPC ....................................................... H04L 63/08
See application file for complete search history.

(56) References Cited

U.S. PATENT DOCUMENTS

| | | | |
|---|---|---|---|
| 2010/0199332 A1* | 8/2010 | Bachmann et al. | 726/4 |
| 2011/0026502 A1* | 2/2011 | Harmatos et al. | 370/338 |
| 2011/0225632 A1* | 9/2011 | Ropolyi et al. | 726/4 |
| 2012/0204253 A1* | 8/2012 | Sugimoto et al. | 726/12 |

(Continued)

FOREIGN PATENT DOCUMENTS

| | | |
|---|---|---|
| CN | 101267319 A | 9/2008 |
| CN | 101459952 A | 6/2009 |

(Continued)

OTHER PUBLICATIONS

International Search Report mailed May 17, 2012 in corresponding International Patent Application No. PCT/CN2011/078083.

(Continued)

*Primary Examiner* — Morshed Mehedi
(74) *Attorney, Agent, or Firm* — Staas & Halsey LLP (57) ABSTRACT

Sending an authentication request message to an authentication device, receiving an authentication response message sent by the authentication device, where the authentication response message includes a trust relationship information element which is used for indicating a trust relationship of a current access, and establishing an S2c tunnel security association according to the trust relationship of the current access. The trust relationship when the non-3GPP access side accesses the EPS network may be obtained, thereby ensuring establishment of a correct S2c tunnel security data channel.

9 Claims, 7 Drawing Sheets

(56) References Cited

U.S. PATENT DOCUMENTS

2012/0263041 A1* 10/2012 Giaretta et al. ............... 370/236
2013/0121322 A1* 5/2013 Salkintzis .................... 370/338
2014/0101726 A1* 4/2014 Gupta et al. ..................... 726/4

FOREIGN PATENT DOCUMENTS

WO            2010/076044 A1     7/2010
WO     WO 2010076044 A1 *     7/2010             H04W 48/16

OTHER PUBLICATIONS

"3rd Generation Partnership Project; Technical Specification Group Core Network and Terminals; Evolved Packet System (EPS); 3GPP EPS AAA interfaces (Release 10)", 3GPP TS 29.273 V10.3.0 (Jun. 2011) *Technical Specification*, 2011, pp. 1-116, 3GPP Organizational Partners, Valbonne, France.

"3rd Generation Partnership Project; Technical Specification Group Core Network and Terminals", Mobility management based on Dual-Stack Mobile IPv6; Stage 3 (Release 10), 3GPP TS 24.303 V10.3.0 (Jun. 2011) *Technical Specification*, 2011, pp. 1-52, 3GPP Organizational Partners, Valbonne, France.

"3rd Generation Partnership Project; Technical Specification Group Services and System Aspects; Architecture enhancements for non-3GPP accesses (Release 10)", 3GPP TS 23.402 V10.4.0 (Jun. 2011) *Technical Specification*, 2011, pp. 1-231, 3GPP Organizational Partners, Valbonne, France.

International Search Report issued May 17, 2012, in corresponding International Patent Application No. PCT/CN2011/078083.

* cited by examiner

METHOD AND APPARATUS FOR ESTABLISHING TUNNEL DATA SECURITY CHANNEL

CROSS-REFERENCE TO RELATED APPLICATIONS

This application is a continuation of International Application No. PCT/CN2011/078083, filed on Aug. 5, 2011, which is hereby incorporated by reference in its entirety.

FIELD

Embodiments of the present invention relate to the field of communications technologies, and more specifically, to a method and an apparatus for establishing an S2c tunnel security association in an evolved packet system (EPS).

BACKGROUND

With the advent of a mobile broadband era, a user needs to use a broadband access service anytime and anywhere, which puts forward a higher requirement on a mobile communication network, such as, a higher transmission rate, a shorter delay, higher system capacity and so on. In order to maintain an advantageous position of a 3GPP network, the 3GPP standard organization started research and standardization working of a System Architecture Evolution (SAE) program at the end of 2004, and defined a new mobile communication network framework, which is referred to as an evolved packet system (EPS). With the trend of convergence and integration of core networks, 3GPP also provides a possibility of accessing of a non-3GPP access network in a core network Evolved Packet Core (EPC) in the EPS system, for example, accessing from WLAN, Wimax and so on to the EPC.

An S2c interface adopts a Mobile IPv6 Support for Dual Stack Hosts (DSMIPv6) protocol, and may be used for a trusted or non-trusted non-3GPP access network to access an EPS network. When a User Equipment (UE) accesses the EPC from the non-3GPP access network through the S2c interface, a security association (SA) is established between the UE and a Packet Data Network Gateway (PDN-GW, which may also be referred to as PGW) to protect DSMIPv6 signaling. When the UE accesses the EPC through the S2c interface from a trusted non-3GPP access network, after 3GPP defines establishment of a DSMIPv6 tunnel between the UE and the PDN-GW, the PDN-GW may initiate establishment of a child security association (Child SA) with the UE to protect a data plane. However, when the UE accesses the EPC from a non-trusted non-3GPP access network, an IPSec security channel is established between the UE and a non-3GPP access gateway, e.g., evolved PDG (ePDG), so that security protection is performed on a data packet between the UE and the PDN-GW through the IPSec security channel. That is, when the UE accesses the EPS in a trusted manner, the Child SA may be established on an S2c tunnel to protect integrity and confidentiality of the data plane; and when the UE accesses the EPS in a non-trusted manner, the IPSec security channel between the UE and the ePDG provides integrity protection and confidentiality protection of data.

As described in the foregoing, when the UE accesses the EPC through the S2c interface, the PDN-GW needs to distinguish between a trusted access scenario and a non-trusted access scenario, so as to complete establishment processes of different data security channels. However, since the PDN-GW cannot determine whether the current UE accesses the EPC from the trusted non-3GPP access network or from the non-trusted non-3GPP access network, it is impossible to select a correct method for establishing an S2c tunnel data security channel.

SUMMARY

Embodiments of the present invention provide a method and an apparatus for establishing an S2c tunnel data security channel, which can ensure establishment of a correct S2c tunnel data security channel.

In one aspect, a method for establishing a data security channel is provided, including: sending an authentication request message to an authentication device, receiving an authentication response message sent by the authentication device, where the authentication response message includes a trust relationship information element which is used for indicating a trust relationship of a current access, and establishing an S2c tunnel security association according to the trust relationship of the current access. Before the receiving the authentication response message sent by the authentication device, the method further includes: determining, by the authentication device, a trust relationship of a current access network according to a configured policy or a trust relationship stored when a non-3GPP access side initiates an authentication request.

In another aspect, a method for establishing a data security channel is provided, including: receiving an authentication request message of a gateway device, determining a trust relationship of a current access according to a configured policy or a trust relationship stored when a non-3GPP access side initiates an authentication request, and sending an authentication response message to the gateway device, where the authentication response message includes a trust relationship information element which is used for indicating the trust relationship of the current access, so that the gateway device establishes an S2c tunnel data security channel according to the indication.

In still another aspect, an authentication device is provided, including: a receiving unit, configured to receive an authentication request of a non-3GPP access; an authenticating unit, configured to perform authentication on the authentication request received by the receiving unit, and determine a trust relationship of a current access according to a configured policy or a trust relationship stored when a non-3GPP access side initiates an authentication request; and a sending unit, configured to send a corresponding authentication response message to a PDN-GW, where the message includes a trust relationship information element which is used for indicating the trust relationship of the current access.

In still another aspect, a gateway device is provided, including: a sending unit, configured to send an authentication request message; a receiving unit, configured to receive an authentication request response message of an authentication apparatus, where the message includes a trust relationship information element which is used for indicating a trust relationship of a current access; and an SA establishing unit, configured to establish an S2c tunnel data security channel according to the trust relationship of the current non-3GPP access indicated in the response message received by the receiving unit.

According to the embodiments of the present invention, when a UE accesses an EPC via an S2c interface from a non-3GPP access network, an authentication response message is received, and a data security channel is established according to a trust relationship of a current access network indicated in the message, thereby ensuring that a correct data security channel is performed.

BRIEF DESCRIPTION OF THE DRAWINGS

To illustrate the technical solutions in the embodiments of the present invention more clearly, the following briefly introduces accompanying drawings needed for describing the embodiments or the prior art. Obviously, the accompanying drawings in the following description are merely some embodiments of the present invention, and persons of ordinary skill in the art may obtain other accompanying drawings from these accompanying drawings without making creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the described embodiments are merely part of rather than all of the embodiments of the present invention. All other embodiments obtained by persons of ordinary skill in the art based on the embodiments of the present invention without making creative efforts shall fall within the protection scope of the present invention.

Figure 1:
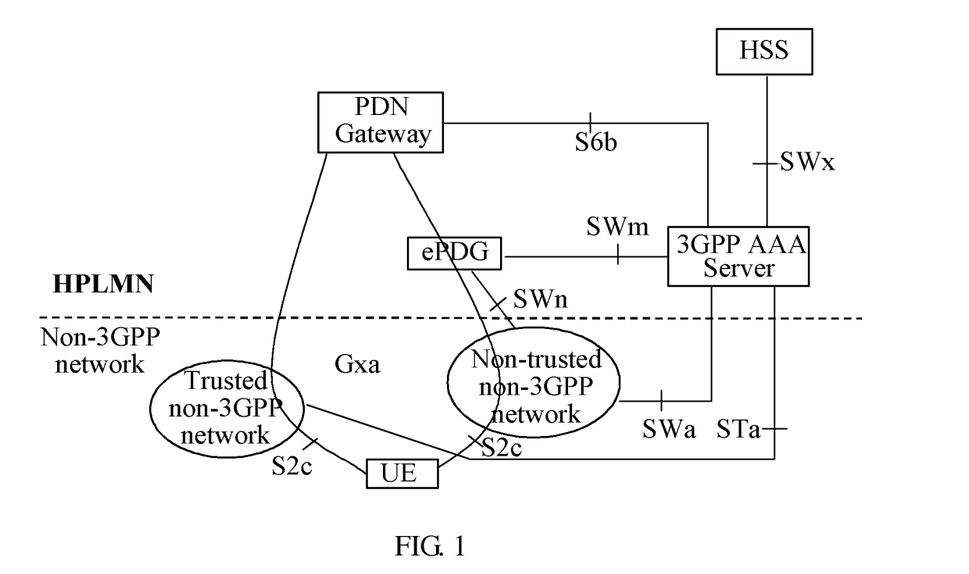
FIG. 1 is a system architecture diagram specified by 3GPP in a non-roaming scenario where a non-3GPP access network accesses an EPS network by adopting an S2c interface.

FIG. 1 is a system architecture diagram specified by 3GPP where a non-3GPP access network accesses an EPS network by adopting an S2c interface. An embodiment of the present invention may be applied to an EPS network architecture shown in FIG. 1.

As shown in FIG. 1, the S2c interface may be used for the non-3GPP access network to access the EPS network. For a trusted non-3GPP access network, a UE is connected to a PDN-GW through the non-3GPP access network directly; while for a non-trusted non-3GPP access network, the UE is connected to a PDN-GW network element through a trusted evolved packet data gateway ePDG of a home network.

When the UE performs authentication from the S2c interface through the PDN-GW, if the UE accesses an EPC from the trusted non-3GPP access network, the PDN-GW needs to initiate establishment of a child security association child SA to protect a data plane; and if the UE accesses the EPC from the non-trusted non-3GPP access network, the PDN-GW establishes a DSMIPv6 security channel through an IPSec channel between the UE and an ePDG to perform integrity protection and confidentiality protection on data.

From the foregoing description, it may be seen that the PDN-GW needs to know whether the current UE accesses the EPC from the trusted non-3GPP access network or from the non-trusted non-3GPP access network, which is a precondition for selecting a correct manner of establishing an S2c tunnel data security channel.

Figure 2:
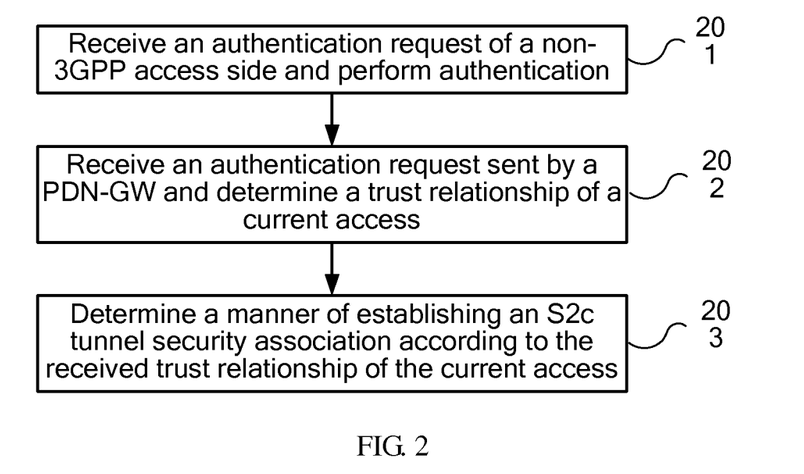
FIG. 2 is a method for establishing a security channel when a non-3GPP access network accesses an EPS network by adopting an S2c interface according to an embodiment of the present invention.

According to the embodiment of the present invention, on the network architecture shown in FIG. 1, an authentication device determines a trust relationship of a current access, and sends the trust relationship to the PDN-GW; the PDN-GW selects a manner of establishing the data security channel according to the indication, which ensures the PDN-GW to perform a correct security channel establishing process. The authentication device in the embodiment of the present invention is all illustrated by taking an Authentication Authorization Accounting (AAA) server. During specific implementation, another device such as a Home Subscriber Server (HSS) may also serve as the authentication device in the embodiment. FIG. 2 is a method for establishing a security channel when a non-3GPP access network accesses an EPS network by adopting an S2c interface according to an embodiment of the present invention.

201: Receive an authentication request of a non-3GPP access side and perform an authentication process. The non-3GPP access side here may be a non-3GPP access network, and may also be an ePDG.

When receiving an authentication request of the non-3GPP access network, an AAA server determines whether a current access is a trusted access or a non-trusted access according to a parameter in the request, where the parameter includes one or several of the following: an access network identity (ANID), a visited network identity Visited Network Identity (this identity is needed only in a roaming scenario), an access type, a security mechanism used in an access network, and so on. A result of the foregoing determination is sent to the non-3GPP access network in an authentication response message, and correspondence between a result of whether the current access is a trusted access and a UE identity is stored, and may also be stored together with correspondence with a network identity.

The following storage method may also be adopted: The AAA server determines that the current access is a trusted access or this authentication request is an authentication process of accessing of the non-3GPP access network, and when sending the result to the non-3GPP access network in the authentication response message, the AAA server does not store the correspondence between the result of whether the current access is a trusted access and the UE identity and/or the network identity.

When receiving an authentication application of an ePDG, if storage information between a non-trusted access result of the current access and the UE identity and/or the network identity does not exist in the AAA server, the AAA server stores correspondence information between the non-trusted access result of the current access and the UE identity and/or the network identity; otherwise, the AAA server does not store the information. Definitely, the following method may also be adopted: No matter whether the storage information of the correspondence between the non-trusted access result of the current access and the UE identity and/or the network identity exists, the AAA server stores the non-trusted access result of the current access and the UE identity and/or the network identity.

The network identity in the foregoing process includes information, such as the visited network identity which is needed in the roaming scenario, the access type, the access network identity, or the security mechanism used in the access network and so on.

202: Receive an authentication request sent by a PDN-GW and determine a trust relationship of a current access, that is, whether the current access is a trusted access or a non-trusted access. The PGW sends an authentication request message to the AAA server, to register information of an Access Point Name (APN) and the PGW. The request message includes a UE identity, and may further include a visited network identity which is needed in the roaming scenario, an access type, an access network identity, a security mechanism used in the access network, and so on. The AAA server performs, according to the UE identity and/or the network identity, a comparison on stored information about whether the current access is a trusted access. If the stored information indicates that the current access is a trusted access, the AAA server determines that the current access is a trusted access. On the contrary, if the stored information is a non-trusted access, the AAA server determines that the current access is a non-trusted access.

Furthermore, if the information about whether the current access is a trusted access is not stored in the AAA server, the current access is considered as a trusted access.

During specific implementation, the following method may also be adopted: The AAA server may also perform, according to the UE identity and/or the network identity, a comparison on the stored trusted access information after receiving the authentication request, if the trusted access information of the current access is not stored, the current access is considered as a trusted access; otherwise, it is considered as a non-trusted access.

The network identity in the foregoing process includes information, such as the visited network identity which is needed in the roaming scenario, the access type, the access network identity, or the security mechanism used in the access network and so on.

203. Determine a manner of establishing an S2c tunnel security association according to the received trust relationship of the current access. The AAA server sends an authentication response message to the PGW. The authentication response message includes a trust relationship information element which, at this time, indicates that the current access is a trusted access. After receiving the trust relationship information element indicating that the current access is a trusted access, the PGW may initiate a Child SA establishing process with a UE at any time. If the PGW receives a Child SA establishing request initiated by the UE, the PGW accepts the Child SA establishing request. On the contrary, after receiving the trust relationship information element indicating that the current access is a non-trusted access, the PGW does not initiate the Child SA establishing process. If the PGW receives a Child SA establishing request sent by the UE, the PGW rejects the Child SA establishing request.

According to the embodiment of the present invention, when the authentication request of the non-3GPP access side is processed, the result of whether the current access is a trusted access is stored, and when the authentication request sent by the PDN-GW is received subsequently, it is determined whether the current access is a trusted access according to the stored trusted access result, and the PGW is notified of the trust relationship information in the response message, so that the PGW may correctly establish the S2c tunnel security association.

Figure 3:
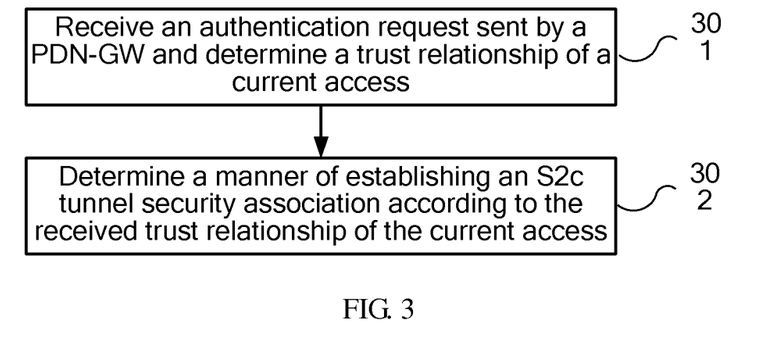
FIG. 3 is a method for establishing a security channel when a non-3GPP access network accesses an EPS network by adopting an S2c interface according to another embodiment of the present invention.

FIG. 3 is a method for establishing a security channel when a non-3GPP access network accesses an EPS network by adopting an S2c interface according to another embodiment of the present invention.

301: Receive an authentication request sent by a PDN-GW and determine a trust relationship of a current access, that is, whether the current access is a trusted access or a non-trusted access. The PGW sends an authentication request message to an AAA server, to register information of an APN and the PGW. The authentication request message includes a UE identity, a visited network identity which is needed in a roaming scenario and an access type, and may further include an access network identity and so on. The AAA server determines whether the current access is a trusted access or a non-trusted access according to one or more of the following parameters: the UE identity, the visited network identity Visited Network Identity which is needed in the roaming scenario, the access network identity ANID, the access type, a security mechanism used in an access network, and so on. The AAA server determines whether the current access is a trusted access according to a configured policy. The policy includes correspondence between information, such as the visited network identity and/or the access network identity and so on, and the trust relationship.

If the policy indicates that the current access is a trusted access, it is determined that the current access is a trusted access; on the contrary, if information in the policy indicates that the current access is a non-trusted access, it is determined that the current access is a non-trusted access.

The network identity in the foregoing process includes information, such as the visited network identity which is needed in the roaming scenario, the access type, the access network identity, or the security mechanism used in the access network and so on.

302. Determine a manner of establishing an S2c tunnel security association according to the received trust relationship of the current access. The AAA server sends an authentication response message to the PGW. The authentication response message includes a trust relationship information element which, at this time, indicates that the current access is a trusted access. After receiving the trust relationship information element indicating that the current access is a trusted access, the PGW may initiate a Child SA establishing process with a UE at any time. If the PGW receives a Child SA establishing request initiated by the UE, the PGW accepts the Child SA establishing request. On the contrary, after receiving the trust relationship information element indicating that the current access is a non-trusted access, the PGW does not initiate the Child SA establishing process. If the PGW receives a Child SA establishing request sent by the UE, the PGW rejects the Child SA establishing request.

According to the embodiment of the present invention, when the AAA server receives the authentication request sent by the PDN-GW, the AAA server determines whether the current access is a trusted access. The PGW is notified of the information about whether the current access is a trusted access in the authentication response message, so that the PGW may correctly establish the S2c tunnel security association.

Figure 4:
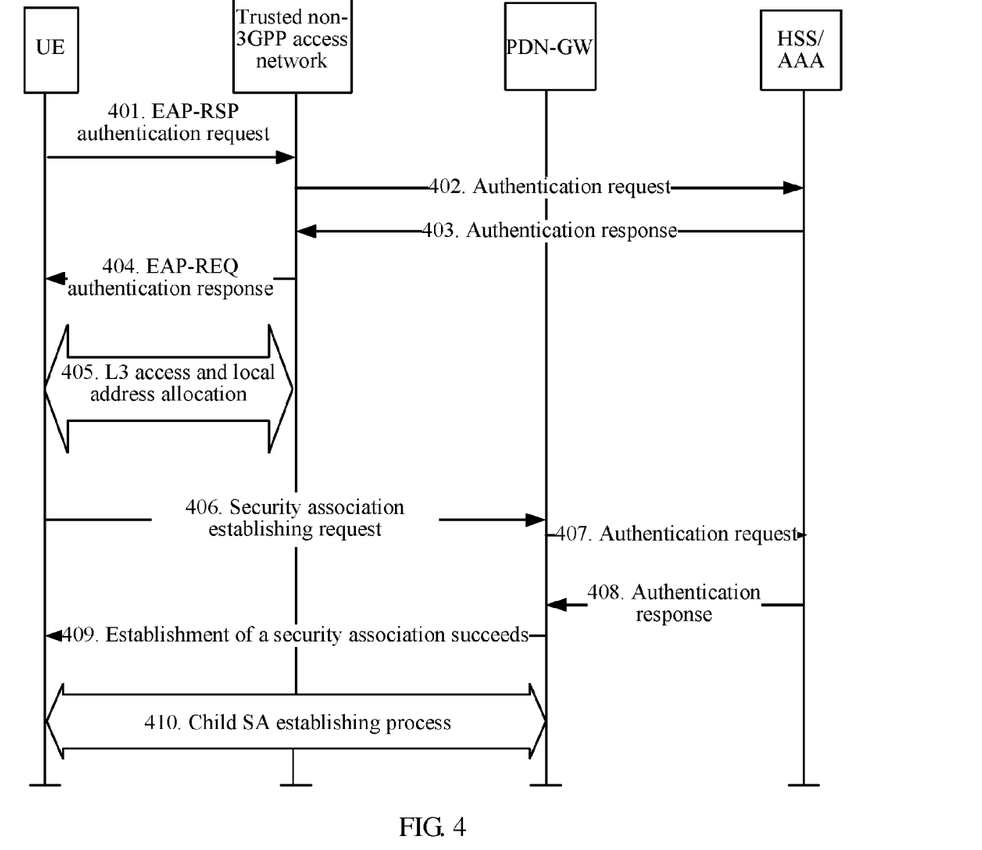
FIG. 4 is a schematic flow chart of a process of establishing a security channel when a trusted non-3GPP access network accesses an EPS network by adopting an S2c interface according to an embodiment of the present invention.

The following describes the embodiments of the present invention in more detail in combination with specific examples. FIG. 4 is a schematic flow chart of a method for establishing a data security channel when a trusted non-3GPP access network accesses an EPS network by adopting an S2c interface according to an embodiment of the present invention.

401. A UE sends an EAP-RSP authentication request message to a trusted non-3GPP access network.

402. The trusted non-3GPP access network sends an authentication request to an AAA server, where the authentication request includes an access network identity (ANID) and an access type, and may further include a security mechanism parameter used in an access network and so on. In a roaming scenario, the authentication request is forwarded to the AAA server from the trusted non-3GPP access network through an AAA proxy. Furthermore, the authentication request further includes a visited network identity.

The AAA server determines whether a current access is a trusted access or a non-trusted access according to a received parameter. The parameter includes one or more of the following: the ANID, the visited network identity which is needed in the roaming scenario, the access type, a security mechanism used in the access network, and so on. A trusted access result is stored together with a UE identity, a network identity or both.

The following method may also be adopted: If determining that the current access is a non-3GPP access network access or a trusted access, the AAA server does not store correspondence between the trusted access result and the UE identity and/or the network identity.

The network identity in the foregoing process includes information, such as the visited network identity which is needed in the roaming scenario, the access type, the access network identity, or the security mechanism used in the access network and so on.

403: The AAA server sends an authentication response message to the trusted non-3GPP access network, where the authentication response message includes the foregoing trusted access result.

404: The trusted non-3GPP access network sends an EAP-REQ authentication response message to the UE, where the EAP-REQ authentication response message includes the trusted access result.

405: The UE triggers a Level 3 (L3) access process. An L3 connection is established between the UE and the trusted non-3GPP access network, and a local IP address CoA is obtained from the access network.

406: The UE sends a security association establishing request to a PDN-GW, so as to establish an SA of DSMIPv6 between the UE and the PDN-GW. Specifically, the security association establishing request may be a security association establishing request message such as an IKE authentication request and so on, where the security association establishing request message includes information of an APN.

407: The PDN-GW sends an authentication request message to the AAA server, to register information of the Access Point Name (APN) and the PDN-GW. The authentication request message includes a UE identity and an access type, and may further include an access network identity, a security mechanism used in an access network, and so on. If in the roaming scenario, the authentication request message further includes a visited network identity. The AAA server performs, according to the UE identity and/or the network identity, a comparison on stored information about whether the current access is a trusted access. If the stored information is a trusted access, the AAA server determines that the current access is a trusted access.

Further, if information about whether the current access is a trusted access does not exist in the AAA server, the current access is considered as a trusted access.

During specific implementation, the following method may also be adopted: the AAA server may also perform, according to the UE identity and/or the network identity, a comparison on the stored information about whether the current access is a trusted access after receiving the authentication request message. If the information about whether the current access is a trusted access is not stored, the AAA server considers the current access as a trusted access; otherwise, the AAA server considers the current access as a non-trusted access.

The network identity in the foregoing process includes information such as the visited network identity which is needed in the roaming scenario, the access type, the access network identity, or the security mechanism used in the access network, and so on.

408: The AAA server sends an authentication response message to the PDN-GW, where the authentication response message includes a trust relationship information element having a value of "trusted" or "non-trusted". The value of "trusted" means that currently it is a trusted access.

409: The PDN-GW sends a security association establishing response message to the UE, where the security association establishing response message includes an IP address allocated to the UE by the PDN-GW.

410: The PDN-GW may initiate a Child SA establishing process with the UE at any time after receiving the trust relationship information element indicating that the current access is a trusted access. If receiving a Child SA establishing request initiated by the UE, the PDN-GW accepts the Child SA establishing request and establishes a Child SA.

Figure 5:
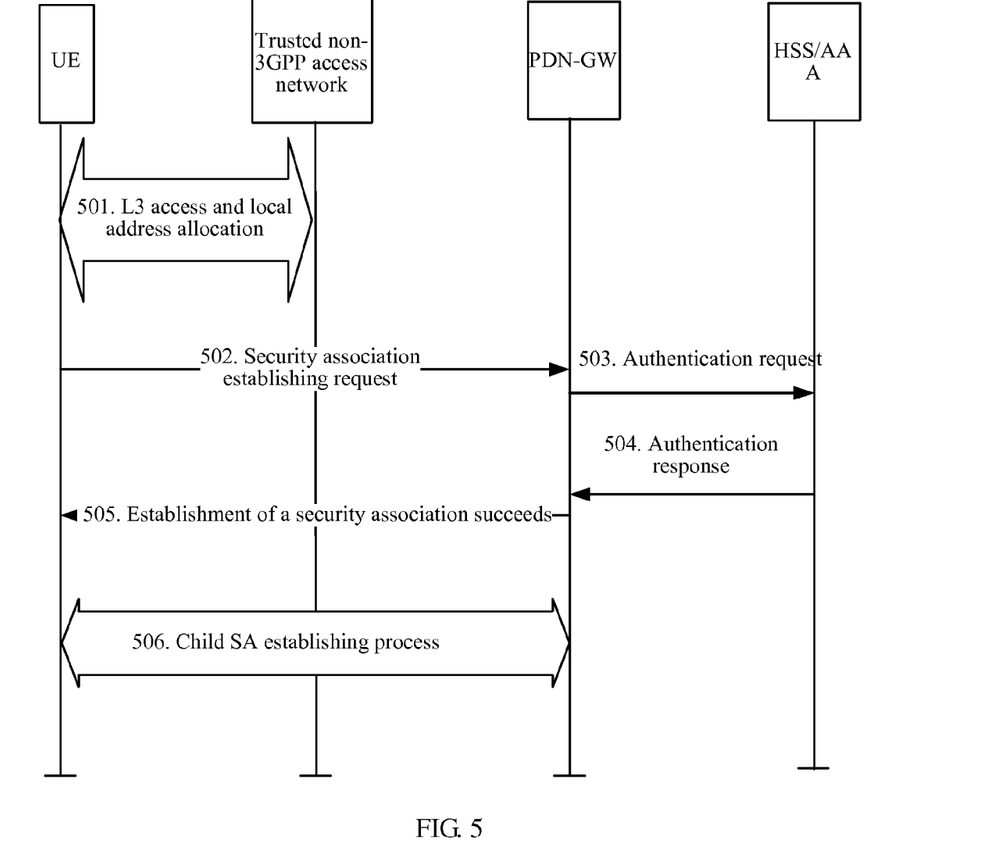
FIG. 5 is a schematic flow chart of a process of establishing a security channel when a trusted non-3GPP access network accesses an EPS network by adopting an S2c interface according to another embodiment of the present invention.

FIG. 5 is a schematic flow chart of a method for establishing a data security channel when a trusted non-3GPP access network accesses an EPS network by adopting an S2c interface according to an embodiment of the present invention.

501: A UE triggers an L3 access process. An L3 connection is established between the UE and a trusted non-3GPP access network, and a local IP address CoA is obtained from the access network.

502: The UE sends a security association establishing request to a PDN-GW, so as to establish an SA of DSMIPv6 between the UE and the PDN-GW. Specifically, the security association establishing request may be a security association establishing request message such as an IKE authentication request and so on, where the security association establishing request message includes information of an APN.

503: The PDN-GW sends an authentication request message to an AAA server, to register information of the APN and the PDN-GW, where the authentication request message includes a UE identity and an access type, and may further include an access network identity and so on. In a roaming scenario, the request message may include a visited network identity. If the AAA server does not find stored information about whether a current access is a trusted access according to the UE identity and/or a network identity, the AAA server considers the current access as a trusted access.

The network identity in the foregoing process includes information, such as the visited network identity which is needed in the roaming scenario, the access type, the access network identity, or a security mechanism used in the access network and so on.

504: The AAA server sends an authentication response message to the PDN-GW, where the authentication response message includes a trust relationship information element having a value of "trusted" or "non-trusted". The value of "trusted" indicates that currently it is a trusted access.

505: The PDN-GW sends a security association establishing response message to the UE, where the security association establishing response message includes an IP address allocated to the UE by the PDN-GW.

506: The PDN-GW may initiate a Child SA establishing process with the UE at any time after receiving the trust relationship information element indicating that the current access is a trusted access. If receiving a Child SA establishing request initiated by the UE, the PGW accepts the Child SA establishing request and establishes a Child SA.

Figure 6:
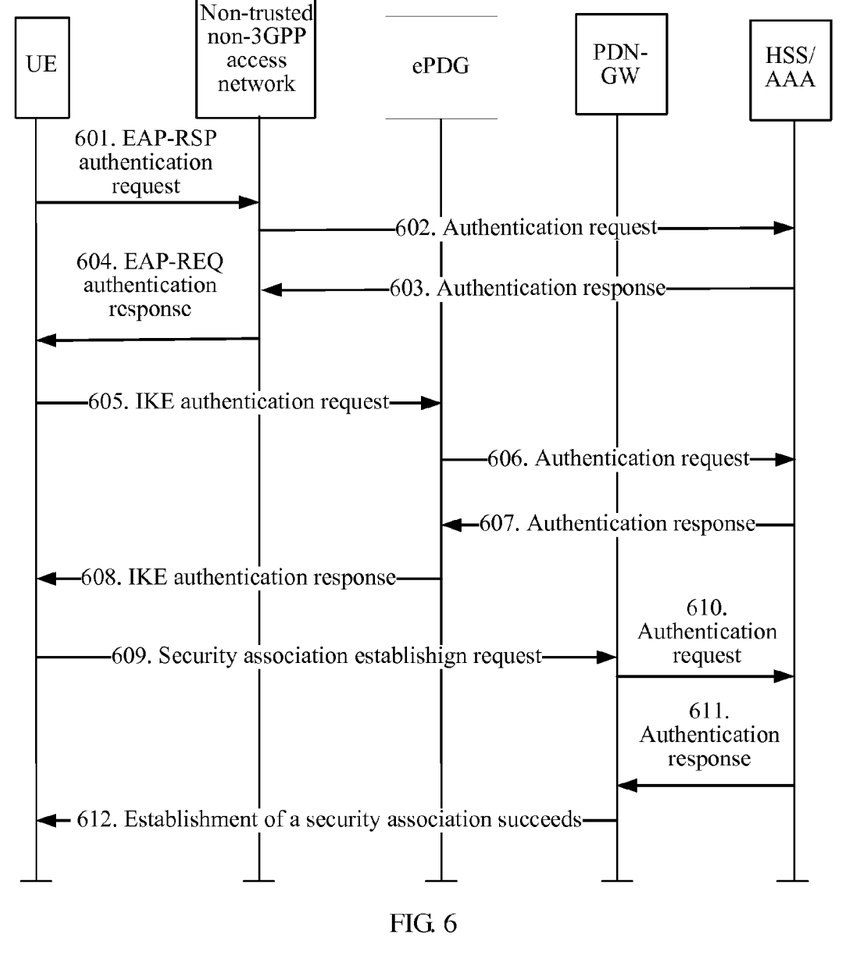
FIG. 6 is a schematic flow chart of a process of establishing a security channel when a non-trusted non-3GPP access network accesses an EPS network by adopting an S2c interface according to another embodiment of the present invention.

FIG. 6 is a schematic flow chart of a process of establishing a security channel when a non-trusted non-3GPP access network accesses an EPS network by adopting an S2c interface according to an embodiment of the present invention.

601. A terminal (e.g., the UE) sends an EAP-RSP authentication request message to a non-trusted non-3GPP access network.

602. The non-trusted non-3GPP access network sends an authentication request to an AAA server, where the authentication request includes an ANID and an access type, and may further include a security mechanism parameter used in an access network. In a roaming scenario, the authentication request submitted by the access network needs to be forwarded to the AAA server through an AAA proxy, and the authentication request includes a visited network identity.

The AAA server determines whether a current access is a trusted access or a non-trusted access according to a parameter in the authentication request. The parameter includes one or more of the following: the ANID, the visited network identity which is needed in the roaming scenario, the access type, a security mechanism used in the access network, and so on. A non-trusted access result, a UE identity and/or a network identity and their correspondence are stored together.

The following method may also be adopted: If determining that the current access is a non-3GPP access network access, the AAA server does not store the non-trusted access result, the UE identity and/or the network identity and their correspondence.

The network identity stored in the foregoing process includes information such as the visited network identity which is needed in the roaming scenario, the access type, or the access network identity and so on.

603: The AAA server sends an authentication response message to the non-trusted non-3GPP access network, where the authentication response message includes the foregoing non-trusted access result.

604: The non-trusted non-3GPP access network sends an EAP-REQ authentication response message to the UE, where the AP-REQ authentication response message includes the foregoing non-trusted access result.

605: The UE sends an IKE authentication request to an ePDG, to request to establish an IPSec tunnel between the UE and the ePDG.

606: The ePDG sends an authentication request to the AAA server, where the authentication request is forwarded by the AAA proxy in the roaming scenario. If the correspondence between the non-trusted access of the current access and the UE identity and/or the network identity is not stored in the AAA server, the AAA server stores the correspondence between the non-trusted access result of the access and the UE identity and/or the network identity at this time; otherwise, the AAA server does not store the information.

The following method may also be adopted: No matter whether the storage information of the correspondence between the non-trusted access result of the current access and the UE identity and/or the network identity exists, the AAA server stores the correspondence between the non-trusted access result of the current access and the UE identity and/or the network identity.

The network identity stored in the foregoing process includes one or more pieces of the following information: the access network identity, the security mechanism used in the access network and the access type, and may further include the visited network identity if in the roaming scenario.

607: The AAA server sends an authentication response message to the ePDG.

608: The ePDG sends an IKE authentication response message to the UE.

609: The UE sends a security association establishing request to a PDN-GW, so as to establish an SA of DSMIPv6 between the UE and the PDN-GW. Specifically, the security association establishing request may be a security association establishing request message such as an IKE authentication request and so on, where the security association establishing request message includes information of an APN.

610: The PDN-GW sends an authentication request message to the AAA server, to register information of the APN and the PDN-GW, where the authentication request message includes a UE identity. The authentication request message may further include a network identity, which includes one or more pieces of the following information: an access network identity, a security mechanism used in the access network and an access type, and may further include a visited network identity if in the roaming scenario. The AAA server determines that currently it is a non-trusted access according to the correspondence between the UE identity and/or the network identity and the stored trust relationship information.

611: The AAA server sends an authentication response message to the PDN-GW, where the authentication response message includes a trust relationship information element having a value of "trusted" or "non-trusted". The value of "trusted" indicates that currently it is a trusted access. After receiving the message indicating that the current access is a non-trusted access, the PDN-GW does not initiate a Child SA establishing process. If receiving a Child SA establishing request sent by the UE, the PDN-GW rejects the Child SA establishing request. A rejection manner may be that: when a cause value in Notify Payload in a response message of the Child SA establishing request indicates "NO_ADDITION­AL_SAS" or "NO_Child_SAS" or other cause values, it means that establishment of a Child SA is not received any more.

612: The PDN-GW sends a security association estab­lishing response message to the UE, where the security association establishing response message includes an IP address allocated to the UE by the PDN-GW.

Figure 7:
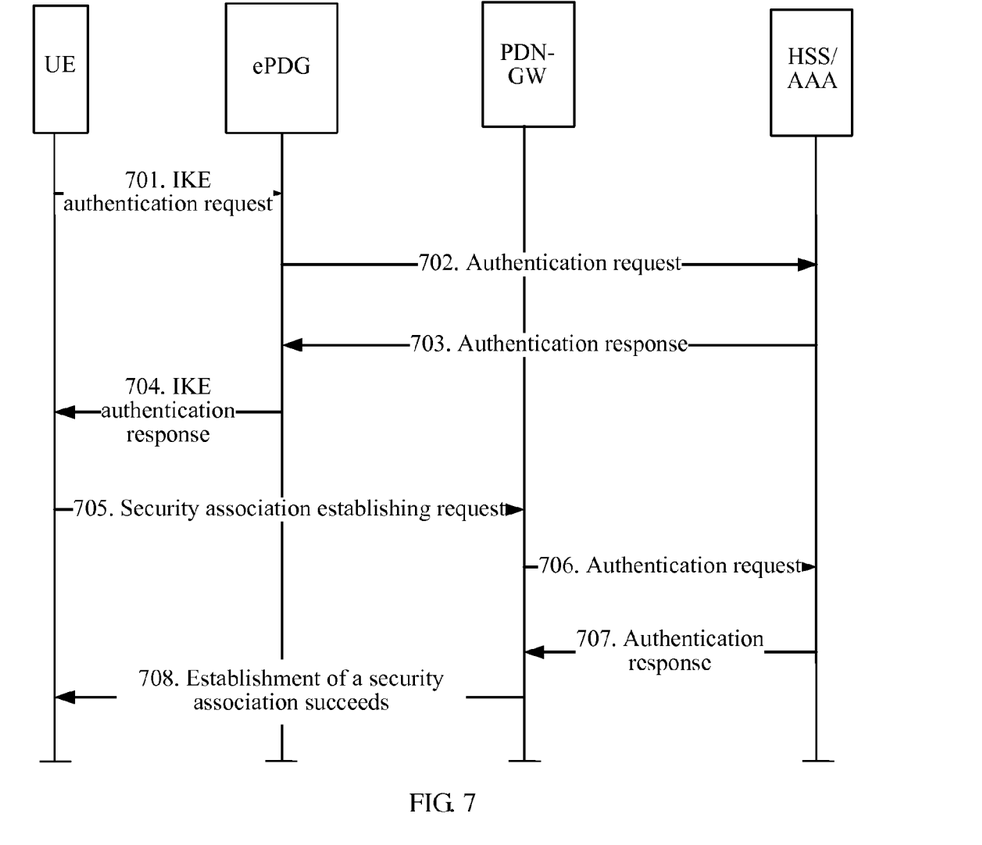
FIG. 7 is a schematic flow chart of a process of establishing a security channel when a non-trusted non-3GPP access network accesses an EPS network by adopting an S2c interface according to another embodiment of the present invention.

FIG. 7 is a schematic flow chart of a process of estab­lishing a security channel when a non-trusted non-3GPP access network accesses an EPS network by adopting an S2c interface according to an embodiment of the present inven­tion.

701: A UE sends an IKE authentication request to an ePDG, to request to establish an IPSec tunnel between the UE and the ePDG.

702: The ePDG sends an authentication request to an AAA server, where the authentication request is forwarded by an AAA proxy in a roaming scenario. If it is found that correspondence between a non-trusted access of a current access and a UE identity and/or a network identity is not stored, the AAA server stores the correspondence between the non-trusted access result of the access and the UE identity and/or the network identity.

The following method may also be adopted: No matter whether the storage information of the correspondence between the non-trusted access result of the current access and the UE identity and/or the network identity exists, the AAA server stores the correspondence between the non-trusted access result of the current access and the UE identity and/or the network identity.

703: The AAA server sends an authentication response message to the ePDG.

704: The ePDG sends an IKE authentication response message to the UE.

705: The UE sends a security association establishing request to a PDN-GW, so as to establish an SA of DSMIPv6 between the UE and the PDN-GW. Specifically, the security association establishing request may be a security associa­tion establishing request message such as an IKE authenti­cation request and so on, where the security association establishing request message includes information of an APN.

706: The PDN-GW sends an authentication request mes­sage to the AAA server, to register information of the APN and the PDN-GW, where the authentication request message includes a UE identity. The authentication request message may further include a network identity, where the network identity includes one or more pieces of the following infor­mation: an access network identity, a security mechanism used in the access network and an access type, and further includes a visited network identity if in the roaming sce­nario. The AAA server determines that currently it is a non-trusted access according to the correspondence between the UE identity and/or the network identity and the stored trust relationship information.

707: The AAA server sends an authentication response message to the PDN-GW, where the authentication response message includes a trust relationship information element having a value of "trusted" or "non-trusted". The value of "trusted" indicates that currently it is a trusted access. After receiving the message indicating that the current access is a non-trusted access, the PDN-GW does not initiate a Child SA establishing process. If the PDN-GW receives a Child SA establishing request sent by the UE, the PDN-GW rejects the Child SA establishing request. A rejection manner may be as follows: when a cause value in Notify Payload in a response message of the Child SA establishing request indicates "NO_ADDITIONAL_SAS" or "NO_Child_SAS" or other cause values, it means that establishment of a Child SA is not received any more.

708: The PDN-GW sends a security association estab­lishing response message to the UE, where the security association establishing response message includes an IP address allocated to the UE by the PDN-GW.

Figure 8:
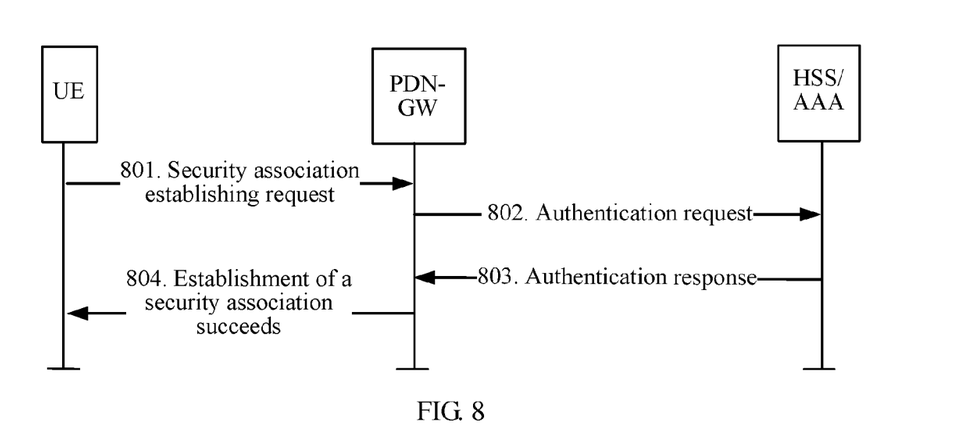
FIG. 8 is a schematic flow chart of a process of establishing a security channel when a non-3GPP access network accesses an EPS network by adopting an S2c interface according to another embodiment of the present invention.

FIG. 8 is a schematic flow chart of a process of estab­lishing a security channel when a non-3GPP access network accesses an EPS network by adopting an S2c interface according to another embodiment of the present invention.

801: A UE sends a security association establishing request to a PDN-GW, so as to establish an SA of DSMIPv6 between the UE and the PDN-GW. Specifically, the security association establishing request may be a security associa­tion establishing request message such as an IKE authenti­cation request and so on, where the security association establishing request message includes information of an APN.

802: The PDN-GW sends an authentication request mes­sage to the AAA server, to register information of the APN and the PDN-GW, where the authentication request message includes a UE identity. The authentication request message may further include a network identity. The network identity may include one or more pieces of the following informa­tion: an access network identity, a security mechanism used in an access network and an access type, and further includes a visited network identity if in a roaming scenario.

The AAA server determines whether a current access is a trusted access according to a configured policy, where the policy includes correspondence between the network iden­tity and a trust relationship. A determination method may be as follows: the AAA server queries the configured policy and determines the trust relationship of a current access network according to the network identity in the authentication request message. If the authentication request message does not include the access network identity, the AAA server may also need to construct an access network identity according to an access type identity. A specific method is that an access type is generally an integer type denotation method, for example, 0 denotes WLAN, 2001 denotes HRPD, and so on. A prefix of the access network is a character string such as "WLAN" and "HRPD". Therefore, the AAA server obtains specific access type description corresponding to an integer of the access type by table look-up according to the access type, and denotes the description with a character string, which is served as a prefix of the access network identity. The access network identity may have no additional char­acter string except the premix, or a generating rule is decided by the AAA server itself.

A determination method may be implemented by adopt­ing the following manner: The policy includes records of a trust relationship and a non-trust relationship; query a con­figured policy data table, if the trust relationship correspond­ing to the network identity is a trusted access, determine that the current access is a trusted access, and if the trust relationship is a non-trusted access, determine that the current access is a non-trusted access. Alternatively, one of the trusted access and the non-trusted access may be set in the policy. For example, only a record of the trusted access is set, if related information cannot be found by querying, it is a non-trusted access.

803: The AAA server sends an authentication response message to the PDN-GW, where the authentication response message includes a trust relationship information element having a value of "trusted" or "non-trusted", for indicating that the current access is a trusted access or a non-trusted access. The PDN-GW receives a trust relationship message of the current access, and determines a manner of establishing an S2c tunnel security association. If it is a trusted access, the PDN-GW may initiate a Child SA establishing process with the UE at any time; and if receiving a Child SA establishing request initiated by the UE, the PDN-GW accepts the Child SA establishing request and establishes a Child SA. If it is a non-trusted access, the PDN-GW does not initiate the Child SA establishing process. Thus, if receiving the Child SA establishing request sent by the UE, the PDN-GW rejects the Child SA establishing request. A rejection manner may be as follows: When a cause value in Notify Payload in a response message of the Child SA establishing request indicates "NO_ADDITIONAL_SAS" or "NO_Child_SAS" or other cause values, it means that establishment of the Child SA is not received any more.

804: The PDN-GW sends a security association establishing response message to the UE, where the security association establishing response message includes an IP address allocated to the UE by the PDN-GW.

Figure 9:
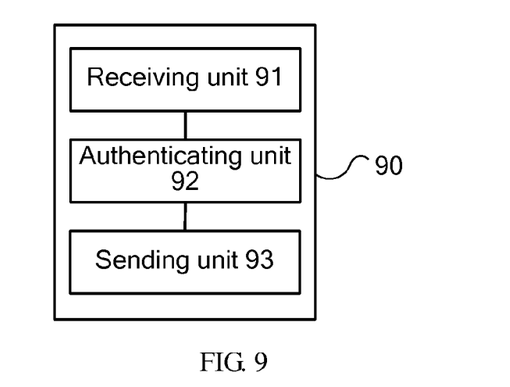
FIG. 9 is a block diagram of an authentication apparatus according to an embodiment of the present invention.

FIG. 9 is a block diagram of an authentication apparatus according to an embodiment of the present invention. The authentication apparatus 90 in FIG. 9 is, for example, the HSS/AAA device shown in FIG. 4 to FIG. 8. The authentication apparatus includes a receiving unit 91, an authenticating unit 92 and a sending unit 93.

The receiving unit 91 receives an authentication request sent by a non-3GPP access side (e.g., a non-3GPP access network or an ePDG) or a PDN-GW when a UE accesses an EPS network through an S2c interface. The authenticating unit 92 performs authentication on the access: for an authentication request sent by the non-3GPP access side, the authenticating unit 92 determines whether a current access is a trusted access, and records correspondence between a trusted access result and a UE identity or a network identity or both; and for an authentication request sent by the PDN-GW, the authenticating unit 92 determines whether the current access is a trusted access according to a configured policy or a trusted access result recorded when authentication is performed on the access side. The sending unit 93 is configured to send a trust access information element to the PDN-GW according to a result of whether the current access is a trusted access, where the result is determined by the authenticating unit 92, so as to indicate whether the current access is a trusted access.

According to the embodiment of the present invention, when accessing the EPS network from the non-3GPP access network through the S2c interface, the UE receives the authentication request sent by the PDN-GW, determines whether the current access is a trusted access according to the configured policy or the correspondence of whether the current access is a trusted access, where the correspondence is recorded when authentication is performed on the authentication request initiated by the access side (e.g., the non-3GPP access network or the ePDG), and sends a trusted access result to the PDN-GW, so that the PDN-GW can obtain information about whether the current access is a trusted access, which implements correct establishment of an S2c tunnel data security channel when the UE accesses the EPS network from the 3GPP access network through the S2c interface.

In an embodiment, when the authenticating unit 92 determines whether the current access is a trusted access according to the configured policy, a determination method may be as follows: According to an access network identity in the authentication request message (a visited network identity is further needed in a roaming scenario), query the configured policy to determine a trust relationship of the current access network. If the authentication request message does not include the access network identity, it is needed to construct an access network identity according to an access type identity. Specifically, an access type is generally an integer type denotation method, for example, 0 denotes WLAN, 2001 denotes HRPD, and so on. A prefix of the access network is a character string such as "WLAN" and "HRPD". The authenticating unit 92 obtains specific access type description corresponding to an integer of the access type by table look-up according to the access type, and denotes the description with a character string, which serves as a prefix of the access network identity. The access network identity may have no additional character string except the premix, or a generating rule is decided by the AAA server itself. The policy includes correspondence between the access network identity (the visited network identity is further needed in the roaming scenario) and the trust relationship.

A determination method may adopt the following manner: query a configured policy data table, and find a trust relationship corresponding to the access network identity (the visited network identity is further needed in the roaming scenario), if the trust relationship is a trusted access, determine that the current access is a trusted access, and if the trust relationship is a non-trusted access, determine that the current access is a non-trusted access. During specification implementation, it may also be adopted that only one of the trusted access and the non-trusted access is set in the policy, for example, only a record of the trusted access is set, if related information cannot be found by querying, it is a non-trusted access.

In another embodiment, the authenticating unit 92 performs authentication on the authentication request of the non-3GPP access side. The non-3GPP access side here may be a non-3GPP access network, and may also be an ePDG.

When performing authentication on the authentication request of the non-3GPP access network, the authenticating unit 92 determines whether the current access is a trusted access or a non-trusted access according to a parameter in the request. The parameter includes one or several of the following: the ANID, the visited network identity which is needed in the roaming scenario, the access type, a security mechanism used in an access network, and so on. Correspondence between a result of whether the current access is a trusted access and the UE identity is stored, and the network identity and the correspondence can be stored together.

The following method may also be adopted: Determine whether the current access is a non-3GPP access network access or a trusted access, do not store the correspondence between the result of whether the current access is a trusted access and the UE identity and/or the correspondence between the result of whether the current access is a trusted access and the network identity.

The network identity in the foregoing process includes information such as the visited network identity which is needed in the roaming scenario, the access type, the access network identity, or the security mechanism used in the access network and so on.

When performing authentication on the authentication request of the ePDG, if not finding storage information of a non-trusted access result of the current access and the UE identity and/or the network identity by querying, the authenticating unit 92, at this time, stores information such as the non-trusted access result of the access and the UE identity and/or the network identity, and so on; otherwise, does not store the information. The following method may also be adopted: No matter whether the storage information of the non-trusted access result of the current access and the UE identity and/or the network identity exists, store the non-trusted access result of the current access and the UE identity and/or the network identity.

Further, when performing authentication on the received authentication request sent by the PDN-GW, the authenticating unit 92 performs, according to the UE identity and/or network identity in the request, comparison on the correspondence stored when performing authentication on an authentication application of the non-3GPP access side between the UE identity and/or the network identity and whether the current access is a trusted access, and if the stored information indicates a trusted access, the authenticating unit 92 determines that the current access is a trusted access, on the contrary, if the stored information indicates a non-trusted access, the authenticating unit 92 determines that the current access is a non-trusted access.

Further, if the information about whether the current access is a trusted access is not stored, the current access is considered as a trusted access.

During specific implementation, the following method may also be adopted: The authenticating unit 92 may also directly perform, according to the UE identity and/or the network identity in the request, comparison on the stored correspondence information about whether the current access is a trusted access after receiving the authentication request, if the information about whether the current access is a trusted access is not stored, the authenticating unit 92 considers the current access as a trusted access, otherwise, the authenticating unit 92 considers the current access as a non-trusted access.

The network identity in the foregoing process includes information such as a visited network identity which is needed in the roaming scenario, an access type, an access network identity, or a security mechanism used in the access network and so on.

The sending unit 93 sends an authentication response message to the PGW, where the message includes a trust relationship information element having a value of "trusted" or "non-trusted". The value of "trusted" indicates that currently it is a trusted access.

Therefore, when the UE accesses the EPS network through the S2c interface from a non-3GPP access, the authentication apparatus 90 of the embodiment of the present invention extends the authentication method to determine whether the current access is a trusted access and send the trusted access result to the PDN-GW, so that the PDN-GW can correctly establish the S2c tunnel data security channel when the UE accesses the EPS network through the S2c interface from the non-3GPP access.

Figure 10:
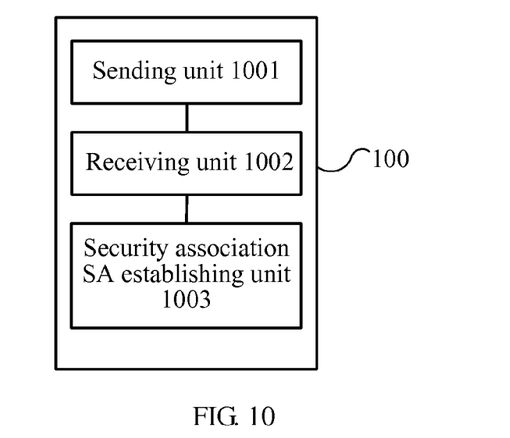
FIG. 10 is a block diagram of a gateway according to an embodiment of the present invention.

FIG. 10 is a block diagram of a gateway according to an embodiment of the present invention. The gateway 100 in FIG. 10 is, for example, the PDN-GW shown in FIG. 4 to FIG. 8. The gateway 100 includes a sending unit 1001, a receiving unit 1002 and a security association SA establishing unit 1003.

The sending unit 1001 sends an authentication request message, and the receiving unit 1002 receives a response message of the authentication apparatus to an authentication request. The security association SA establishing unit 1003 establishes an S2c tunnel data security channel according to a trust relationship of the non-3GPP access indicated in the response message received by the receiving unit 1002.

According to the embodiment of the present invention, when the non-3GPP access accesses an EPS network through an S2c interface, the authentication request response message of the authentication apparatus, where the message includes information indicating the trust relationship of this non-3GPP access, is received, then the security association SA establishing unit 1003 determines a manner of establishing an S2c tunnel security association according to the trust relationship information. If this non-3GPP access is a trusted access, a child security association Child SA establishing process with a UE is initiated at any time; and if a child security association Child SA establishing request initiated by the UE is received, the request is accepted and a child security association Child SA is established. If this non-3GPP access is a non-trusted access, the child security association Child SA establishing process is not initiated any more; and if the child security association Child SA establishing request sent by the UE is received, the request is rejected. A rejection manner may be as follows: when "NO_ADDITIONAL_SAS" or "NO_Child_SAS" or another cause value is indicated in Notify Payload in the response message of the child security association Child SA establishing request, it means that establishment of the child security association Child SA is not received any more. In this way, the S2c tunnel data security channel is correctly established.

Therefore, when the UE accesses the EPS network from the non-3GPP access through the S2c interface, the gateway apparatus of the embodiment of the present invention receives the authentication message which includes indication information of the trust relationship of a current access, and then correctly establishes the S2c tunnel data security association according to obtained content of the indication information, therefore can ensure the correct establishment of the S2c tunnel data security channel when the UE accesses the EPS network from the non-3GPP access through the S2c interface.

A communication system according to the embodiments of the present invention may include the foregoing authentication apparatus 90 and/or the gateway 100.

Persons of ordinary skill in the art may be aware that, in combination with the examples described in the embodiments here, units and algorithm steps can be implemented by electronic hardware, computer software, or a combination of the two. To clearly illustrate interchangeability between the hardware and the software, the foregoing description has generally described composition and steps of each example according to functions. Whether the functions are executed in a manner of hardware or software depends on a particular application and a design constraint condition of the technical solutions. Persons skilled in the art may use different methods to implement the described functions for every particular application, but it should not be considered that such implementation goes beyond the scope of the present invention.

It may be clearly understood by persons skilled in the art that, for convenience and brevity of description, for a detailed working process of the foregoing system, apparatus and unit, reference may be made to the corresponding process in the method embodiments, which is not repeatedly described here.

In the embodiments provided in the present application, it should be understood that the disclosed system, apparatus and method may be implemented in other manners. For example, the foregoing described apparatus embodiments are merely exemplary. For example, division of the units is merely logical function division and there may be other division manners in practical implementation. For example, multiple units or components may be combined or integrated into another system, or some features may be ignored or not executed. In addition, the displayed or discussed mutual couplings or direct couplings or communication connections may be implemented through some interfaces. The indirect couplings or communication connections between the apparatuses or units may be implemented in an electronic, mechanical or another manner.

The units described as separate parts may or may not be physically separate, and parts displayed as units may or may not be physical units, may be located in one position, or may be distributed on multiple network elements. Part of or all of the units may be selected according to an actual need to achieve the objectives of the solutions of the embodiments.

In addition, functional units in the embodiments of the present invention may be integrated into a processing unit, or each of the units may exist alone physically, or two or more units are integrated into one unit. The integrated unit may be implemented in a form of hardware, or may be implemented in a form of a software functional unit.

When being implemented in the form of a software functional unit and sold or used as a separate product, the integrated unit may be stored in a computer-readable storage medium. Based on such understanding, the technical solutions of the present invention essentially, or the part contributing to the prior art, or all of or part of the technical solutions may be implemented in a form of a software product. The computer software product is stored in a storage medium and includes several instructions for instructing a computer device (which may be a personal computer, a server, a network device, and the like) to execute all of or part of the steps of the methods described in the embodiments of the present invention. The storage medium includes: any medium that may store program codes, such as a U-disk, a removable hard disk, a read-only memory (ROM, Read-Only Memory), a random access memory (RAM, Random Access Memory), a magnetic disk, or a compact disk and so on.

The foregoing descriptions are merely specific implementation manners of the present invention, but not intended to limit the protection scope of the present invention. Any variation or replacement that is readily conceivable to persons skilled in the art without departing from the technical scope disclosed in the present invention shall fall within the protection scope of the present invention. Therefore, the protection scope of the present invention shall be subject to the protection scope of the claims.

What is claimed is:

1. A method for establishing a child security association (Child SA) between a user equipment (UE) and a packet data network (PDN) gateway, comprising:
   sending, by the PDN gateway, an authentication request message to an authentication device;
   receiving, by the PDN gateway, an authentication response message from the authentication device so that the PDN gateway is able to determine whether the UE accesses an Evolved Packet Core (EPC) network via a trusted non-3GPP access network from a trust relationship information element comprised in the authentication response message; and
   establishing, by the PDN gateway, the Child SA with the UE according to an indication of the trust relationship information element that the UE accesses the EPC network via the trusted non-3GPP access network.

2. The method according to claim 1, wherein the establishing the Child SA with the UE comprises:
   initiating, by the PDN gateway, a Child SA establishing process.

3. The method according to claim 1, wherein the establishing the Child SA with the UE comprises:
   receiving, by the PDN gateway, a Child SA establishing request from the UE; and
   accepting, by the PDN gateway, the Child SA establishing request.

4. The method according to claim 1, wherein the indication of the trust relationship information element has a value of "trusted" which indicates that the UE accesses the EPC network via a trusted non-3GPP access network.

5. The method according to claim 1, wherein the authentication device is an authentication authorization accounting (AAA) server or a Home Subscriber Server (HSS).

6. A packet data network (PDN) gateway, comprising:
   a transmitter configured to send an authentication request message to an authentication device;
   a receiver configured to receive an authentication request response message from the authentication device, so that the PDN gateway is able to determine whether the UE accesses an Evolved Packet Core (EPC) network via a trusted non-3GPP access network from a trust relationship information element comprised in the authentication response message; and
   a processor coupled to the transmitter and the receiver and configured to:
      establish a child security association (Child SA) with the UE according to an indication of the trust relationship information element that the UE accesses the EPC network via a trusted non-3GPP access network.

7. The PDN gateway according to claim 6, wherein the processor is configured to initiate a Child SA establishing process with the UE.

8. The PDN gateway according to claim 6, wherein
   the receiver is further configured to receive a Child SA establishing request from the UE; and
   the processor is further configured to accept the Child SA establishing request.

9. The PDN gateway according to claim 6, wherein the indication of the trust relationship information element has a value of "trusted" which indicates that the UE accesses the EPC network via a trusted non-3GPP access network.

* * * * *